Patented Apr. 15, 1930

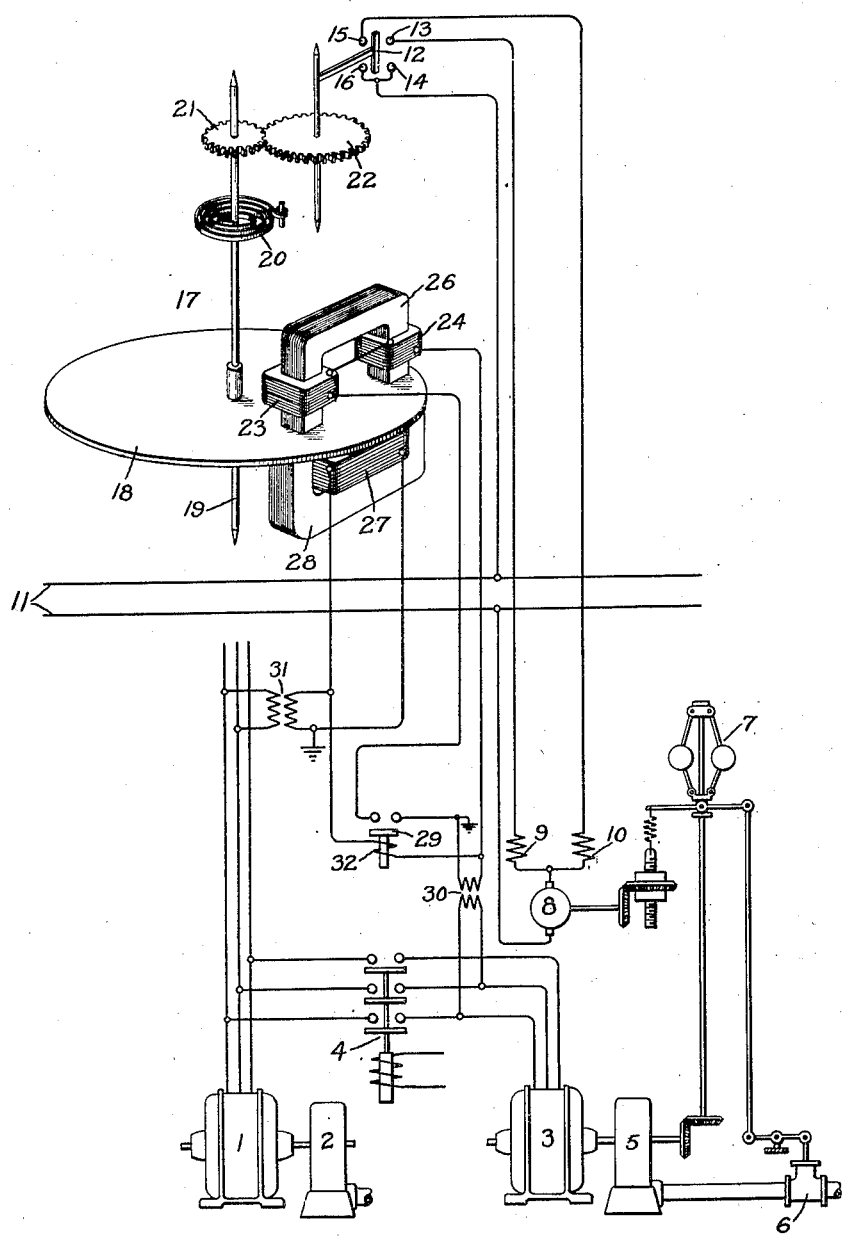

1,755,064

UNITED STATES PATENT OFFICE

LUKE F. KENNEDY, OF SCHENECTADY, NEW YORK, ASSIGNOR TO GENERAL ELECTRIC COMPANY, A CORPORATION OF NEW YORK

SYNCHRONIZING DEVICE

Application filed January 11, 1926. Serial No. 80,433.

My invention relates to synchronizing devices, and has for its principal object the provision of an improved means for equalizing the frequencies of two alternating current machines.

In order to avoid disturbance when two alternating current machines are interconnected, it is necessary that the machines be operating at frequencies which are substantially the same. In accordance with my invention, equality in the frequencies of the machines is produced by means operable to raise or lower the frequency of one of the machines in response to change in the phase relation between the machine voltages.

My invention will be better understood from the following description when considered in connection with the accompanying drawing, and its scope will be pointed out in the appended claims.

The single figure of the drawing shows a control system wherein my invention has been embodied.

This system comprises an electrical machine 1 which is coupled to a prime mover 2 and is adapted to be interconnected with an electrical machine 3 through a switch 4 operated in any suitable manner. Operation of the machine 3 is produced by a steam turbine 5 supplied with operating fluid through a valve or gate 6 which is maintained in a position dependent on the turbine speed by means comprising a governor 7 operated in accordance with the turbine speed. A pilot motor 8 provided with oppositely wound field windings 9 and 10 is arranged to be connected to a control current supply line 11 through a rotatable contact member 12 which engages contacts 13 and 14 when moved in one direction and engages contacts 15 and 16 when moved in the opposite direction.

The direction in which the contact member 12 is moved is determined by the relation between the frequencies of the machines 1 and 3. In explaining the construction and operation of the invention, it will be assumed that the frequency of the machine 1 is constant and that the frequency of the machine 3 is varied to bring it into synchronism with the machine 1. When the frequency of the machine 3 is lower than that of the machine 1, the contact member 12 engages contacts 13 and 14 during successive intervals of time determined by the difference between the machine frequencies. When the frequency of the machine 3 is higher than that of the machine 1, the contact member 12 engages the contacts 15 and 16 during successive intervals of time likewise determined by the difference between the machine frequencies.

These results are produced by means comprising a motor element 17 having a disk armature 18 mounted on a shaft 19 biased to a predetermined position by means shown as a spring 20 and connected to the contact member 12 through gears 21 and 22. The motor element 17 also includes field coils 23 and 24 wound on a core member 26 and a field coil 27 wound on a core member 28. The field coils 23 and 24 are arranged to be connected in series to one phase of the machine 3 through a relay switch 29 and a potential transformer 30. The field coil 27 is connected to the corresponding phase of the machine 1 through a potential transformer 31. The disk 18, therefore, has a torque exerted thereon which varies as a function of the angle between the voltages of the machines 1 and 3. The particular function of the angle in accordance with which the torque varies depends upon the particular control arrangement with which the motor element is used. Since in the particular arrangement shown in the drawing the disk 18 rotates in one direction when one voltage leads the other and in the opposite direction when it lags the other, the motor element 17 is arranged so that the torque exerted on the disk 18 is equal to the product of the voltages of the machines 1 and 3 and the sine of the angle between the voltages. With such a motor element the torque on the disk is zero when the voltages are in phase coincidence and in phase opposition and the direction of rotation of the disk depends upon the relative frequencies of the machines 1 and 3 when the voltages move away from phase coincidence and phase opposition. It will be observed that a lead of each of the potential transformers 30 and 31 is grounded and that the switch 29 is provided with an operating coil 32 which is connected between the ungrounded leads of the potential transformers. With these connections, the resultant sum of the machine voltages is applied to the operating coil 32 of the relay switch 29.

The relay switch 29 is preferably so designed that it is maintained closed by a much smaller current than that required to operate it to its closed position. Under these conditions, the switch 29 will be closed at about the time the machine voltages come into phase and will be opened shortly before the machine voltages get into phase opposition.

Thus assuming the frequency of the machine 3 to be slightly lower than that of the machine 1, the contact member 12 is moved into engagement with the contacts 13 and 14 each time the machine voltages come into phase with one another and is maintained in engagement with these contacts until the machine voltages approach phase opposition. While the contact member 12 is in engagement with contacts 13 and 14, the pilot motor 8 is connected to the supply line 11 through its field winding 9 and the setting of the governor 7 is adjusted to increase the speed of the turbine 5 and machine 1. The speed and frequency of the machine 3 are thus increased in a series of steps, the contact member 12 being returned to its neutral position by the spring 20 each time that the machine voltages approach phase opposition.

If the frequency of the machine 3 exceeds that of the machine 1, the contact member 12 is rotated into engagement with contacts 15 and 16, the pilot motor 8 is connected to the supply circuit through its field winding 10, and the governor setting is adjusted step by step to decrease the speed and frequency of the machine 3. Any departure of the frequency of the machine 3 from that of the machine 1 thus immediately brings into operation a notching-up or notching-down process by which the frequencies of the two machines are equalized.

The embodiment of the invention illustrated and described herein has been selected for the purpose of clearly setting forth the principles involved. It will be apparent, however, that the invention is susceptible of being modified to meet the different conditions encountered in its use, and I, therefore, aim to cover by the appended claims all modifications within the true spirit and scope of my invention.

What I claim as new and desire to secure by Letters Patent of the United States is:

1. The combination of a plurality of alternating current circuits, means for controlling the relative frequencies of said circuits, and means operable in accordance with the phase relation between the voltages of said circuits for periodically operating said control means in a manner to produce substantial equality between said frequencies.

2. The combination of a plurality of alternating current circuits, means for producing substantial equality between the frequencies of said circuits including a motor element comprising a field coil connected to one of said circuits and a second field coil arranged to be connected to the other of said circuits, means operable to vary the connections between said second mentioned field winding and said other circuit in accordance with the phase relation between the voltages of said circuits, and means controlled by said element for changing the frequency of one of said circuits.

3. The combination of two alternating current circuits, and means operable to change periodically the frequency of one of said circuits including means responsive to phase coincidence of the circuit voltages.

4. The combination of two alternating current circuits, and means for periodically effecting a change in the frequency of one of said circuits to produce substantial equality between the circuit frequencies comprising a relay arranged to be energized in accordance with the resultant of the circuit voltages.

5. The combination of an alternating current circuit, a machine to be connected thereto and means including relay means controlled in accordance with the phase relation of the voltages of said circuit and said machine for effecting in steps an increase and a decrease in the frequency of said machine to produce substantial equality between the frequency of said machine and the frequency of said circuit.

6. The combination of two alternating current circuits, and means for changing the frequency of one of said circuits to produce substantial equality between the frequencies of said circuits including a relay having a movable element and cooperating windings arranged to be energized from said circuits so that when said windings are energized a torque which varies as a function of the angle between the voltages of said circuits is exerted on said element, and means for periodically controlling the connection of one of the windings of said relay so that said relay operates periodically to effect a decrease in the frequency of said one of said circuits when said frequency is too high and an increase in said frequency when it is too low.

7. The combination of two alternating current circuits, and means for changing the frequency of one of said circuits to produce substantial equality between the frequencies of said circuits including a relay having a movable element and cooperating windings arranged to be energized from said circuits so that when said windings are energized a torque which varies as a function of the angle between the voltages of said circuits is exerted on said element, and means responsive to a predetermined relation between the voltages of said circuits for so controlling the connection of one of the windings of said relay that said relay operates periodically to effect a decrease in the frequency of said one of said circuits when said frequency is too high and an increase in said frequency when it is too low.

8. The combination of two alternating current circuits, and means for changing the frequency of one of said circuits to produce substantial equality between the frequencies of said circuits including a relay having a movable element and cooperating windings arranged to be energized from said circuits so that when said windings are energized a torque which varies as a function of the sine of the angle between the voltages of said circuits is exerted on said element, and means responsive to a predetermined relation between the voltages of said circuits for controlling the connection of one of the windings of said relay so that said relay is rendered operative periodically to effect a change in the frequency of said one of said circuits when the torque exerted on said element by said windings is substantially zero.

9. The combination of two alternating current circuits, an alternating current dynamo-electric machine connected to one of said circuits, driving means for said machine, and means for controlling the operation of said driving means so as to produce substantial equality between the frequencies of said circuits comprising a relay having a movable element and cooperating windings adapted to be connected to said circuits so that they exert when energized a torque which varies as the sine of the angle between the voltages of said circuits, and means responsive to the voltages of said circuits for effecting the connection of one of said windings to one of said circuits when the voltages are substantially in phase and for effecting the disconnection of said one of said windings when the phase difference between the voltages exceeds a predetermined amount.

In witness whereof, I have hereunto set my hand this 9th day of January, 1926.

LUKE F. KENNEDY.